(12) United States Patent
Mu et al.

(10) Patent No.: US 10,777,207 B2
(45) Date of Patent: Sep. 15, 2020

(54) METHOD AND APPARATUS FOR VERIFYING INFORMATION

(71) Applicant: Baidu Online Network Technology (Beijing) Co., Ltd., Beijing (CN)

(72) Inventors: Yang Mu, Beijing (CN); Wenyu Wang, Beijing (CN); Lan Li, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 144 days.

(21) Appl. No.: 16/105,847

(22) Filed: Aug. 20, 2018

(65) Prior Publication Data

US 2019/0066696 A1     Feb. 28, 2019

(30) Foreign Application Priority Data

Aug. 29, 2017   (CN) .......................... 2017 1 0757507

(51) Int. Cl.
| | |
|---|---|
| *G06F 21/32* | (2013.01) |
| *G06F 3/01* | (2006.01) |
| *G10L 17/00* | (2013.01) |
| *G10L 17/02* | (2013.01) |
| *G10L 17/04* | (2013.01) |
| *H04L 29/06* | (2006.01) |
| *G10L 17/22* | (2013.01) |

(Continued)

(52) U.S. Cl.
CPC ........ *G10L 17/22* (2013.01); *G06Q 20/40145* (2013.01); *G10L 15/22* (2013.01); *G06F 21/32* (2013.01); *G06F 2221/2103* (2013.01); *G10L 17/00* (2013.01)

(58) Field of Classification Search
CPC ........ G06F 21/32; G06F 3/011; G06F 19/322; G10L 11/00; G10L 17/00; G10L 17/02; H04L 63/0861; H04L 9/32; H04L 17/04
See application file for complete search history.

(56) References Cited

U.S. PATENT DOCUMENTS

| | | | | |
|---|---|---|---|---|
| 5,897,616 A | * | 4/1999 | Kanevsky | ............... G10L 17/24 |
| | | | | 379/88.02 |
| 7,721,109 B1 | * | 5/2010 | Herder | .................... G06F 21/32 |
| | | | | 705/64 |

(Continued)

FOREIGN PATENT DOCUMENTS

| | | |
|---|---|---|
| CN | 103138921 A | 6/2013 |
| CN | 104064062 A | 9/2014 |

(Continued)

*Primary Examiner* — Anne L Thomas-Homescu
(74) *Attorney, Agent, or Firm* — Knobbe, Martens, Olson & Bear, LLP

(57) ABSTRACT

The present disclosure discloses a method and apparatus for verifying information. The method includes: acquiring a target combination of question and answer, the target combination of question and answer comprising a question and an answer to the question; sending the question in the target combination of question and answer to a terminal device; receiving to-be-confirmed voice information sent by the terminal device, and recognizing the to-be-confirmed voice information to generate a to-be-confirmed answer; and determining that the to-be-confirmed voice information is verified, if the to-be-confirmed answer matches the answer in the target combination of question and answer.

12 Claims, 6 Drawing Sheets

(51) Int. Cl.
*G10L 15/22* (2006.01)
*G06Q 20/40* (2012.01)

(56) References Cited

U.S. PATENT DOCUMENTS

| | | | |
|---|---|---|---|
| 9,286,899 B1* | 3/2016 | Narayanan | G10L 17/24 |
| 2006/0036443 A1* | 2/2006 | Chaudhari | G10L 17/22 |
| | | | 704/273 |
| 2006/0136219 A1* | 6/2006 | Wang | G06F 21/31 |
| | | | 704/273 |
| 2007/0061590 A1* | 3/2007 | Boye | G06F 21/305 |
| | | | 713/186 |
| 2008/0134317 A1* | 6/2008 | Boss | G06F 21/31 |
| | | | 726/18 |
| 2009/0268882 A1* | 10/2009 | Lee | H04M 3/5158 |
| | | | 379/88.02 |
| 2013/0305324 A1* | 11/2013 | Alford, Jr. | G06F 21/31 |
| | | | 726/5 |
| 2014/0259138 A1* | 9/2014 | Fu | H04L 63/083 |
| | | | 726/7 |
| 2014/0289323 A1* | 9/2014 | Kutaragi | G06Q 50/01 |
| | | | 709/203 |
| 2015/0067822 A1* | 3/2015 | Randall | G10L 17/04 |
| | | | 726/17 |
| 2015/0235642 A1* | 8/2015 | Nishikawa | G10L 17/00 |
| | | | 704/249 |
| 2016/0372116 A1* | 12/2016 | Summerfield | G10L 25/63 |
| 2017/0140174 A1* | 5/2017 | Lacey | G06F 21/6245 |
| 2017/0169203 A1* | 6/2017 | Onodera | G06F 21/32 |
| 2017/0318013 A1* | 11/2017 | Roy | H04L 63/0861 |
| 2018/0089412 A1* | 3/2018 | Kopikare | G06K 9/00006 |
| 2018/0365379 A1* | 12/2018 | Markley | H04L 63/0861 |
| 2019/0204907 A1* | 7/2019 | Xie | G06F 3/048 |
| 2019/0281042 A1* | 9/2019 | Jakobsson | G06F 21/552 |

FOREIGN PATENT DOCUMENTS

| | | |
|---|---|---|
| JP | 2004-139221 A | 5/2004 |
| JP | 2017-108767 A | 6/2017 |
| KR | 10-2006-0063647 A | 6/2006 |

* cited by examiner

METHOD AND APPARATUS FOR VERIFYING INFORMATION

CROSS-REFERENCE TO RELATED APPLICATIONS

This application claims priority to Chinese Patent Application no. 201710757507.5, filed with the State Intellectual Property Office of the People's Republic of China (SIPO) on Aug. 29, 2017, the content of which is incorporated herein by reference in its entirety.

TECHNICAL FIELD

The present disclosure relates to the field of computer technology, specifically relates to the field of Internet technology, and more specifically relates to a method and apparatus for verifying information.

BACKGROUND

In recent years, Internet payment has been widely used. There are many methods for verifying Internet payment. In the related art, the verification is usually performed using a verification code, a Quick Response (QR) code, and the like. The verification is relatively monotonic.

SUMMARY

The objective of embodiments of the present disclosure is to propose an improved method and apparatus for verifying information, to solve a part of the technical problem mentioned in the foregoing Background.

In a first aspect, the embodiments of the present disclosure provide a method for verifying information. The method includes: acquiring a target combination of question and answer, the target combination of question and answer including a question and an answer to the question; sending the question in the target combination of question and answer to a terminal device; receiving to-be-confirmed voice information sent by the terminal device, and recognizing the to-be-confirmed voice information to generate a to-be-confirmed answer; and determining that the to-be-confirmed voice information is verified, if the to-be-confirmed answer matches the answer in the target combination of question and answer.

In some embodiments, before the acquiring a target combination of question and answer, the method further includes: determining a value of an attribute of a user, based on voiceprint information of the user acquired previously, the attribute including gender and age; and determining the target combination of question and answer matching the value of the attribute of the user from at least one given combination of question and answer.

In some embodiments, after the receiving to-be-confirmed voice information sent by the terminal device, the method further includes: extracting voiceprint characteristic information from the to-be-confirmed voice information, and determining a similarity between the voiceprint characteristic information and pre-stored voiceprint characteristic information of the user.

In some embodiments, the recognizing the to-be-confirmed voice information to generate a to-be-confirmed answer includes: performing speech recognition on the to-be-confirmed voice information to generate an answer string if the similarity is less than or equal to a preset similarity threshold, and defining the answer string as the to-be-confirmed answer.

In some embodiments, after the recognizing the to-be-confirmed voice information to generate a to-be-confirmed answer, the method further includes: comparing the to-be-confirmed answer with the answer in the target combination of question and answer; and determining, if the to-be-confirmed answer is identical to the answer in the target combination of question and answer or the similarity between the to-be-confirmed answer and the answer in the target combination of question and answer is greater than or equal to a preset answer similarity threshold, that the to-be-confirmed answer matches the answer in the target combination of question and answer.

In some embodiments, the question in the combination of question and answer may be a binary question; and the at least one combination of question and answer includes at least one of: the combination of question and answer entered by the user pre-stored on the terminal device, the combination of question and answer in a given knowledge database, or the combination of question and answer about information of an item purchased by the user.

In a second aspect, the embodiments of the present disclosure provide an apparatus for verifying information. The apparatus includes: an acquisition unit, configured to acquire a target combination of question and answer, the target combination of question and answer including a question and an answer to the question; a sending unit, configured to send the question in the target combination of question and answer to a terminal device; a recognition unit, configured to receive to-be-confirmed voice information sent by the terminal device, and recognize the to-be-confirmed voice information to generate a to-be-confirmed answer; and a determination unit, configured to determine that the to-be-confirmed voice information is verified, if the to-be-confirmed answer matches the answer in the target combination of question and answer.

In some embodiments, the apparatus further includes: an attribute value determination unit, configured to determine a value of an attribute of a user, based on voiceprint information of the user acquired previously, the attribute including gender and age; and a combination determination unit, configured to determine the target combination of question and answer matching the value of the attribute of the user from at least one given combination of question and answer.

In some embodiments, the apparatus further includes: a similarity determination unit, configured to extract voiceprint characteristic information from the to-be-confirmed voice information, and determine a similarity between the voiceprint characteristic information and pre-stored voiceprint characteristic information of the user.

In some embodiments, the recognition unit is further configured to: perform speech recognition on the to-be-confirmed voice information to generate an answer string if the similarity is less than or equal to a preset similarity threshold, and define the answer string as the to-be-confirmed answer.

In some embodiments, the apparatus further includes: a comparison unit, configured to compare the to-be-confirmed answer with the answer in the target combination of question and answer; and a matching determination unit, configured to determine, if the to-be-confirmed answer is identical to the answer in the target combination of question and answer or the similarity between the to-be-confirmed answer and the answer in the target combination of question and answer is greater than or equal to a preset answer similarity threshold, that the to-be-confirmed answer matches the answer in the target combination of question and answer.

In some embodiments, the question in the combination of question and answer may be a binary question; and the at least one combination of question and answer includes at least one of: the combination of question and answer entered by the user pre-stored on the terminal device, the combination of question and answer in a given knowledge database, or the combination of question and answer about information of an item purchased by the user.

In a third aspect, the embodiments of the present disclosure provide a server, including: one or more processors; and a storage apparatus, for storing one or more programs, the one or more programs, when executed by the one or more processors, cause the one or more processors to implement the method for verifying information according to any one of the embodiments.

In a fourth aspect, the embodiments of the present disclosure provide a non-transitory computer readable storage medium, storing a computer program thereon, the program, when executed by a processor, implements the method for verifying information according to any one of the embodiments.

The method and apparatus for verifying information provided by the embodiments of the present disclosure first acquires a target combination of question and answer, where the target combination of question and answer includes a question and an answer to the question, then sends the question in the target combination of question and answer to a terminal device, then receives to-be-confirmed voice information sent by the terminal device and recognizes the to-be-confirmed voice information to generate a to-be-confirmed answer, and finally determines that the to-be-confirmed voice information is verified, if the to-be-confirmed answer matches the answer in the target combination of question and answer. By recognizing the to-be-confirmed voice information to obtain the to-be-confirmed answer, and confirming that the to-be-confirmed answer matches the answer in the target combination of question and answer, the method provided by the embodiments of the present disclosure determines that the to-be-confirmed voice information is verified, so that the payment verification method can be enriched.

BRIEF DESCRIPTION OF THE DRAWINGS

After reading detailed descriptions of non-limiting embodiments given with reference to the following accompanying drawings, other features, objectives and advantages of the present disclosure will become more apparent.

DETAILED DESCRIPTION OF EMBODIMENTS

The present application will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
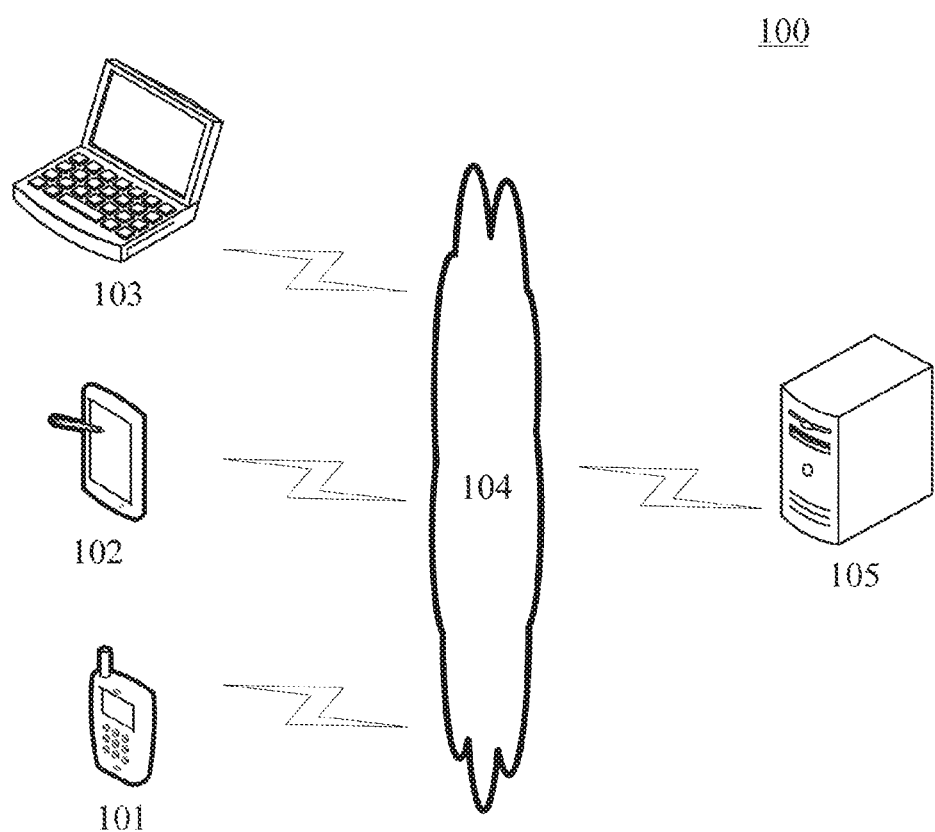
FIG. 1 is an illustrative system architecture diagram to which the present disclosure may be applied.

FIG. 1 shows an illustrative architecture of a system 100 which may be used by a method for verifying information or an apparatus for verifying information according to the embodiments of the present application.

As shown in FIG. 1, the system architecture 100 may include terminal devices 101, 102, and 103, a network 104 and a server 105. The network 104 serves as a medium providing a communication link between the terminal devices 101, 102, and 103, and the server 105. The network 104 may include various types of connections, such as wired or wireless transmission links, or optical fibers.

The user may use the terminal device 101, 102, or 103 to interact with the server 105 through the network 104, in order to transmit or receive messages, etc. Various communication client applications, such as payment applications, shopping applications, search applications, instant messaging tools, mailbox clients, and social platform software, which support speech recognition, may be installed on the terminal devices 101, 102, and 103.

The terminal devices 101, 102, and 103 may be various electronic devices having a display and supporting speech recognition, including but not limited to, smart phones, tablet computers, e-book readers, MP3 (Moving Picture Experts Group Audio Layer III) players, MP4 (Moving Picture Experts Group Audio Layer IV) players, laptop computers, and desktop computers.

The server 105 may be a server providing various services, for example, a backend server providing support to the combination of question and answer displayed on the terminal device 101, 102 or 103. The backend server may perform processing such as analysis on data such as the acquired target combination of question and answer, and return a processing result (for example, information indicating that the to-be-confirmed voice information is verified) to the terminal device.

It should be noted that the method for verifying information according to the embodiments of the present application is generally executed by the server 105. Accordingly, an apparatus for verifying information is generally installed on the server 105.

It should be appreciated that the numbers of the terminal devices, the networks and the servers in FIG. 1 are merely illustrative. Any number of terminal devices, networks and servers may be provided based on the actual requirements.

Figure 2:
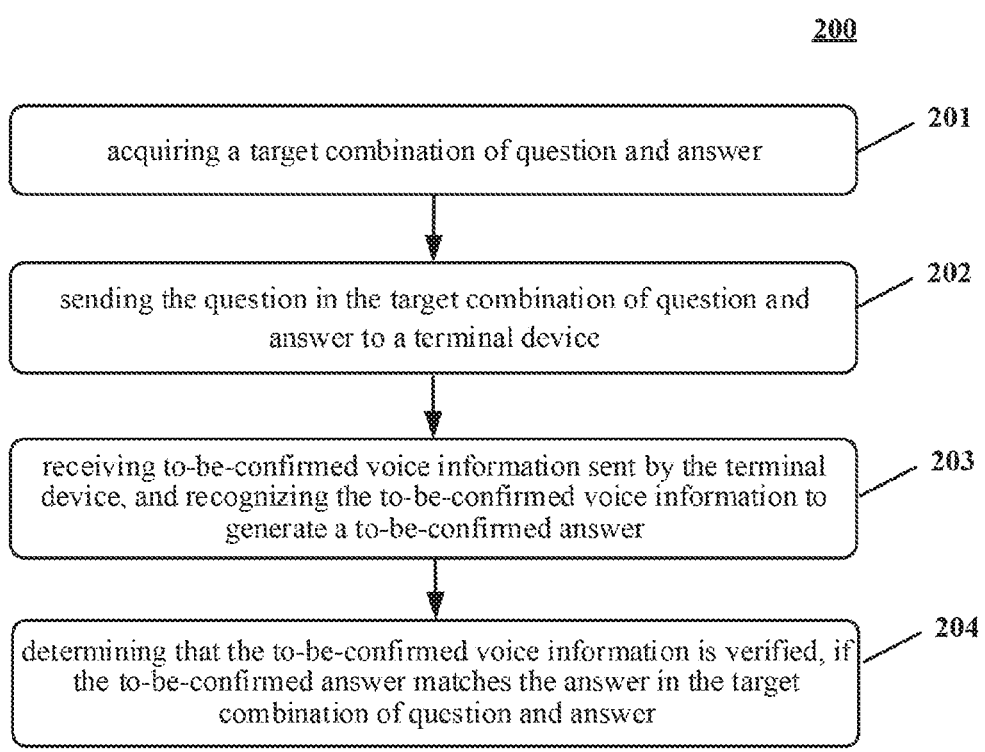
FIG. 2 is a flowchart of an embodiment of a method for verifying information according to the present disclosure.

Further referring to FIG. 2, a flow 200 of an embodiment of the method for verifying information according to the present disclosure is illustrated. The method for verifying information includes the following steps:

Step 201, acquiring a target combination of question and answer.

In this embodiment, the electronic device (e.g., the server as shown in FIG. 1) on which the method for verifying information runs may acquire a target combination of question and answer locally or from other electronic devices through a wired connection or a wireless connection. The target combination of question and answer includes a question and an answer to the question. The target combination of question and answer is at least one combination of question and answer determined previously. It should be noted that the question and the answer in the combination of question and answer herein may be in a one-to-one relationship or a one-to-many relationship. That is, one question may correspond to a plurality of answers, which may have the same or similar semantics.

Step 202, sending the question in the target combination of question and answer to a terminal device.

In this embodiment, after acquiring the target combination of question and answer, the electronic device sends the question in the target combination of question and answer to the terminal device, to facilitate the terminal device to display the question in the target combination of question and answer to the user. Specifically, the electronic device may generate information including the question, and then send the information to the terminal device.

Step 203, receiving to-be-confirmed voice information sent by the terminal device, and recognizing the to-be-confirmed voice information to generate a to-be-confirmed answer.

In this embodiment, the electronic device receives to-be-confirmed voice information sent by the terminal device, and recognizes the to-be-confirmed voice information to generate the to-be-confirmed answer corresponding to the to-be-confirmed voice information.

The to-be-confirmed voice information is voice information generated from the voice of the user collected by using the terminal device, and whether the to-be-confirmed voice information matches the answer in the target combination of question and answer is to be confirmed. The to-be-confirmed answer is the answer that whether it matches the answer in the target combination of question and answer is to be confirmed. The to-be-confirmed answer may be composed of characters. The recognition here may be speech recognition, which can be used to obtain a string corresponding to the voice information, that is, to obtain the to-be-confirmed answer.

Besides, the recognition here may also include voiceprint recognition in addition to performing speech recognition to obtain the to-be-confirmed answer.

Step 204, determining that the to-be-confirmed voice information is verified, if the to-be-confirmed answer matches the answer in the target combination of question and answer.

In this embodiment, the electronic device determines that the to-be-confirmed voice information is verified, if the to-be-confirmed answer matches the answer in the target combination of question and answer. Specifically, the answer in the target combination of question and answer may be compared with the to-be-confirmed answer. The matching may be that the similarity between the answer in the target combination of question and answer and the to-be-confirmed answer is high (that is, the similarity is higher than a similarity threshold), or the answer in the target combination of question and answer and the to-be-confirmed answer are identical. The verification of the to-be-confirmed voice information indicates that the to-be-confirmed answer indicated by the voice of the user collected by the terminal device matches the answer in the target combination of question and answer.

For example, the question in the target combination of question and answer may be "what is the next sentence of to be, or not to be" and the answer in the combination may be "that is the question." The to-be-confirmed answer is "it's that is the question." Then, the similarity between the two answers is 80%. If the similarity threshold is 75%, the obtained similarity is greater than the similarity threshold, and it may be determined that the to-be-confirmed answer matches the answer in the target combination of question and answer.

Figure 3:
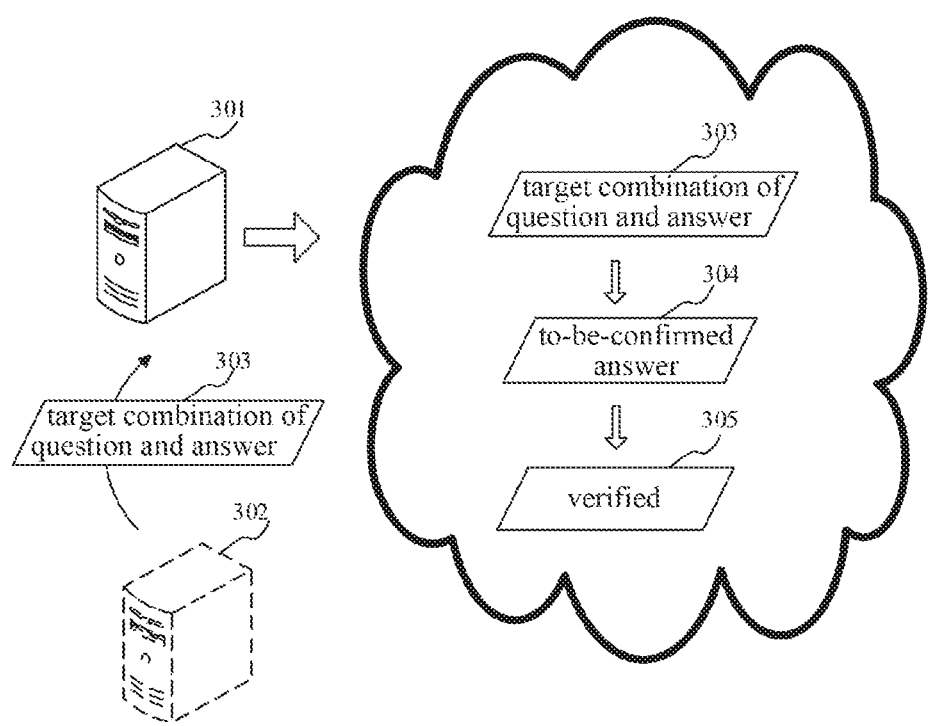
FIG. 3 is a schematic diagram of an application scenario of the method for verifying information according to the present disclosure.

Further referring to FIG. 3, a schematic diagram of an application scenario of the method for verifying information according to the present embodiment is shown. In the application scenario of FIG. 3, the electronic device 301 first acquires the target combination of question and answer 303 locally or from another electronic device 302. The combination of question and answer includes a question and an answer to the question. The question in the target combination of question and answer is "what is the next sentence of to be, or not to be," the answer is "that is the question." Then, the electronic device may send the question in the target combination of question and answer to the cell phone used by the user. Then, the electronic device receives the recorded to-be-confirmed voice information of the user sent by the cell phone of the user, and recognizes the to-be-confirmed voice information to generate the to-be-confirmed answer 304 "it's that is the question." Finally, if the answer "that is the question" matches the answer "it's that is the question," the electronic device determines that the to-be-confirmed voice information is verified 305.

By recognizing the to-be-confirmed voice information to obtain the to-be-confirmed answer, and confirming that the to-be-confirmed answer matches the answer in the target combination of question and answer, the method provided by the embodiments of the present disclosure determines that the to-be-confirmed voice information is verified, so that the payment verification method can be enriched.

Figure 4:
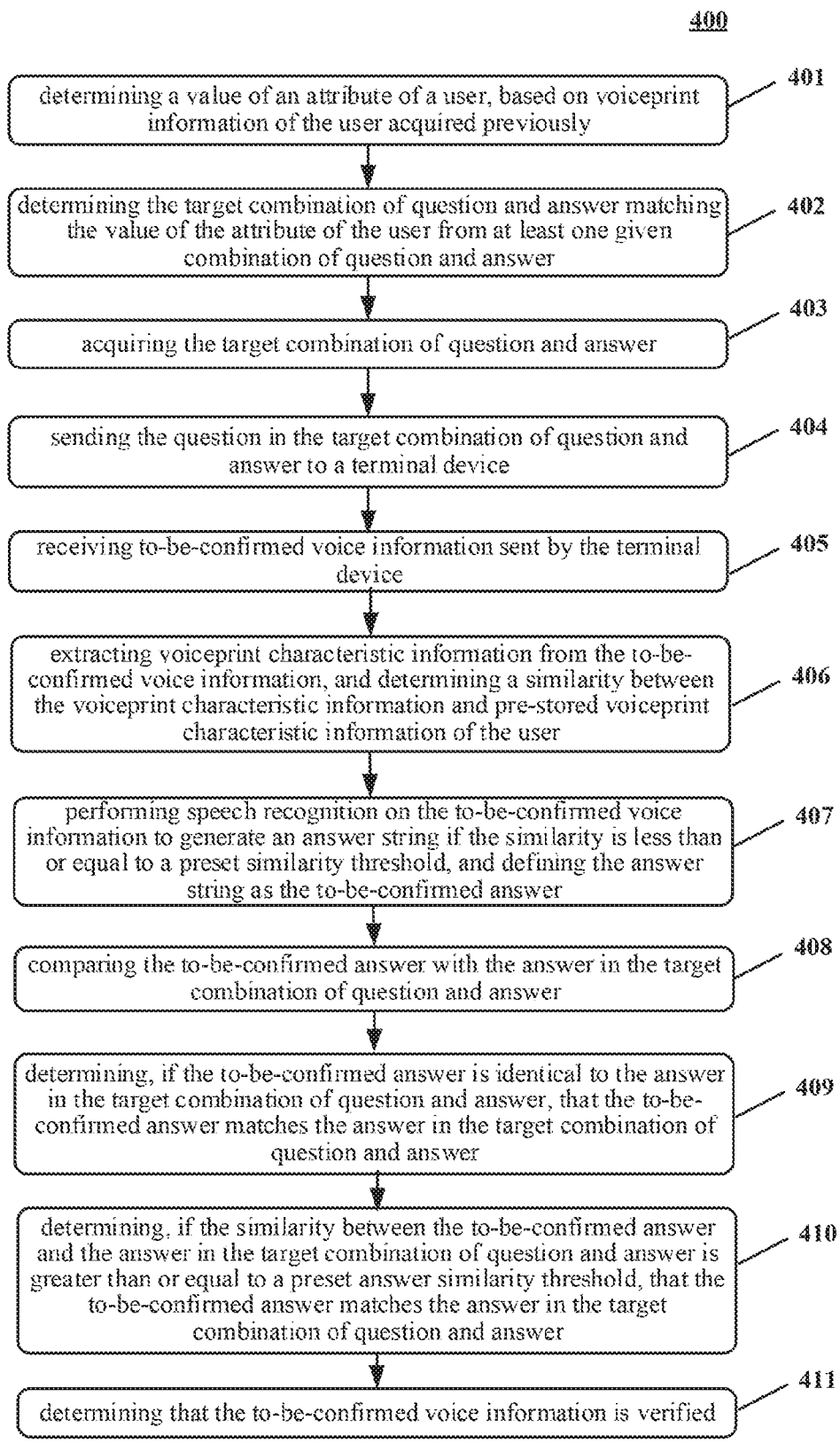
FIG. 4 is a flowchart of another embodiment of the method for verifying information according to the present disclosure.

Further referring to FIG. 4, a flow 400 of another embodiment of the method for verifying information is illustrated. The flow 400 of the method for verifying information includes the following steps:

Step 401, determining a value of an attribute of a user, based on voiceprint information of the user acquired previously.

In this embodiment, the server determines a value of an attribute of a user, based on voiceprint information of the user acquired previously. The voiceprint information is a displayable sound spectrum of speech information. The attribute may include gender and age. Values of the gender and the age of the user providing the voiceprint information may be estimated based on the voiceprint information. For example, the attribute of the user may be the information that characterizes the user's characteristic, such as the gender and the age. The value of the attribute is a specific value of the attribute. For example, the attribute is the gender and the value may be female. The attribute is the age and the value may be 18. The value of the user's age determined here may be a numerical interval or a specific numerical value.

Step 402, determining the target combination of question and answer matching the value of the attribute of the user from at least one given combination of question and answer.

In this embodiment, the server determines the target combination of question and answer matching the value of the attribute of the user from at least one given combination of question and answer.

In the server itself or other electronic devices, a plurality of given combinations of question and answer may be stored. Each combination of question and answer has the corresponding value of the attribute of the user. For example, when the attributes of the user are the gender and the age, and the values are male and 18 years old respectively, there may be 500 stored combinations of question and answer correspondingly. The corresponding combinations of question and answer are suitable for the values of the attributes of the user. For example, when the values are respectively male and 18 years old, the question in the corresponding combinations of question and answer is "which company is the producer of game A" and the answer is "company B." The question may also be "which city is the capital of country A?" and the answer is "city B."

The value of the attribute of the user corresponding to different combinations of question and answer may be identical or different. Each combination of question and answer may correspond to a specific value of the attribute, and may also correspond to a numerical interval of the value of the attribute.

In some alternative implementations of the present embodiment, prior to step 402, an interval, i.e., a numerical range, may be set for the value of the attribute of the user. A set of combinations of question and answer matching different intervals is established. The set of combinations of question and answer includes a plurality of combinations of question and answer.

Step 403, acquiring the target combination of question and answer.

In this embodiment, the server may acquire the target combination of question and answer locally or from another electronic devices through a wired connection or a wireless connection. Here, the combination of question and answer includes the question and the answer to the question. The target combination of question and answer is at least one combination of question and answer determined previously.

In some alternative implementations of the present embodiment, the question in the combination of question and answer may be a binary question. The at least one combination of question and answer includes at least one of: the combination of question and answer entered by the user pre-stored on the terminal device, the combination of question and answer in a given knowledge database, or the combination of question and answer about information of an item purchased by the user.

Here, the information of the item purchased by the user is the information related to the item purchased by the user. For example, the name of the item purchased by the user. For example, the question may be "please say the name of the item you purchased this time." The answer is "a record." The knowledge in the given knowledge database may be a type of knowledge or multiple types of knowledge.

Step 404, sending the question in the target combination of question and answer to a terminal device.

In this embodiment, after acquiring the target combination of question and answer, the server sends the question in the target combination of question and answer to the terminal device, to facilitate the terminal device to display the question in the target combination of question and answer to the user. Specifically, the server may generate information including the question, and then send the information to the terminal device.

Step 405, receiving to-be-confirmed voice information sent by the terminal device.

In this embodiment, the server receives to-be-confirmed voice information sent by the terminal device. The to-be-confirmed voice information is generated from the voice of the user collected by using the terminal device, and whether the to-be-confirmed voice information matches the answer in the target combination of question and answer is to be confirmed.

Step 406, extracting voiceprint characteristic information from the to-be-confirmed voice information, and determining a similarity between the voiceprint characteristic information and pre-stored voiceprint characteristic information of the user.

In this embodiment, the server extracts the voiceprint characteristic information from the to-be-confirmed voice information to obtain the voiceprint characteristic information. Then, the server determines the similarity between the voiceprint characteristic information and the pre-stored voiceprint characteristic information of the user.

Specifically, the voiceprint characteristic information may include at least one of: a degree of retroflexion characteristic parameter, a vocal cord characteristic parameter, an oral cavity characteristic parameter, or a nasal sound characteristic parameter. The similarity refers to the similarity between the extracted voiceprint characteristic information and the pre-stored voiceprint characteristic information for at least one of the above-mentioned parameters. After extracting the voiceprint characteristic information, the server compares the obtained voiceprint characteristic information with the pre-stored voiceprint characteristic information of the user to determine the similarity between the two pieces of voiceprint characteristic information.

Step 407, performing speech recognition on the to-be-confirmed voice information to generate an answer string if the similarity is less than or equal to a preset similarity threshold, and defining the answer string as the to-be-confirmed answer.

In this embodiment, if it is determined by the server that the similarity is less than or equal to the preset similarity threshold, the server performs speech recognition on the to-be-confirmed voice information to generate the answer string, and defines the generated answer string as the to-be-confirmed answer. The preset similarity threshold is a preset threshold for the similarity. The answer string is a string of the answer provided by the user.

Step 408, comparing the to-be-confirmed answer with the answer in the target combination of question and answer.

In this embodiment, the server compares the obtained to-be-confirmed answer with the answer in the target combination of question and answer. In this way, the server can know whether the to-be-confirmed answer is identical to the answer in the target combination of question and answer.

Step 409, determining, if the to-be-confirmed answer is identical to the answer in the target combination of question and answer, that the to-be-confirmed answer matches the answer in the target combination of question and answer.

In this embodiment, after the comparison, if the server determines that the obtained to-be-confirmed answer is identical to the answer in the target combination of question and answer, it may be determined that the to-be-confirmed answer matches the answer in the target combination of question and answer.

Step 410, determining, if the similarity between the to-be-confirmed answer and the answer in the target combination of question and answer is greater than or equal to a preset answer similarity threshold, that the to-be-confirmed answer matches the answer in the target combination of question and answer.

In this embodiment, the server determines the similarity between the to-be-confirmed answer and the answer in the target combination of question and answer, and determines whether the obtained similarity is greater than or equal to the preset answer similarity threshold. If the similarity is determined to be greater than or equal to the preset answer similarity threshold, it is determined that the to-be-confirmed answer matches the answer in the target combination of question and answer. The preset answer similarity threshold is a preset threshold for the similarity between the answers.

It should be noted that the above step 409 and step 410 may be performed alternatively.

Step 411, determining that the to-be-confirmed voice information is verified.

In this embodiment, the server determines that the to-be-confirmed voice information is verified, if the to-be-confirmed answer matches the answer in the target combination of question and answer.

In this embodiment, the value of the attribute of the user is determined based on the voiceprint information of the user, and then the target combination of question and answer matching the value of the attribute of the user is determined, so that the determination process is more pertinent. Further, the present embodiment determines that the to-be-confirmed answer matches the answer in the target combination of question and answer, and the extracted voiceprint characteristic information is similar to the pre-stored voiceprint characteristic information of the user, thereby determining that the to-be-confirmed voice information is verified. In this way, the accuracy of the verification can be improved by using two determination processes.

Figure 5:
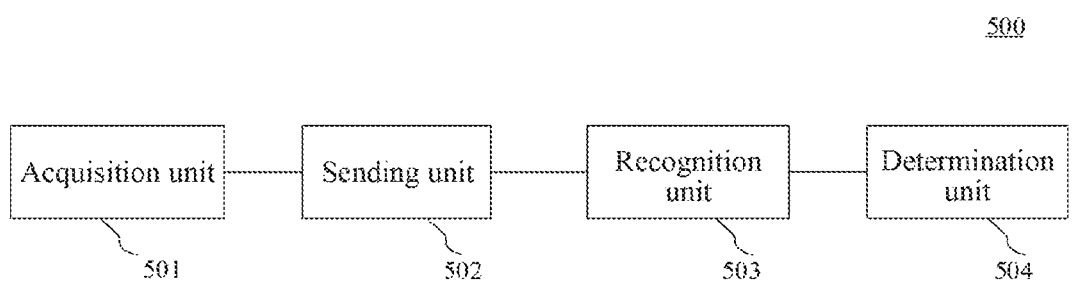
FIG. 5 is a schematic structural diagram of an embodiment of an apparatus for verifying information according to the present disclosure.

Further referring to FIG. 5, as an implementation to the method shown in the above figures, the present disclosure provides an embodiment of an apparatus for verifying information. The apparatus embodiment corresponds to the method embodiment shown in FIG. 2, and the apparatus may specifically be applied to various electronic devices.

As shown in FIG. 5, the apparatus 500 for verifying information of the present embodiment includes: an acquisition unit 501, a sending unit 502, a recognition unit 503, and a determination unit 504. The acquisition unit 501 is configured to acquire a target combination of question and answer, the target combination of question and answer including a question and an answer to the question. The sending unit 502 is configured to send the question in the target combination of question and answer to a terminal device. The recognition unit 503 is configured to receive to-be-confirmed voice information sent by the terminal device, and recognize the to-be-confirmed voice information to generate a to-be-confirmed answer. The determination unit 504 is configured to determine that the to-be-confirmed voice information is verified, if the to-be-confirmed answer matches the answer in the target combination of question and answer.

In this embodiment, the acquisition unit 501 may acquire a target combination of question and answer locally or from other electronic devices through a wired connection or a wireless connection. Here, the target combination of question and answer includes a question and an answer to the question. The target combination of question and answer is at least one combination of question and answer determined previously. It should be noted that the question and the answer in the combination of question and answer herein may be in a one-to-one relationship or a one-to-many relationship. That is, one question may correspond to a plurality of answers, which may have the same or similar semantics.

In this embodiment, after acquiring the target combination of question and answer, the sending unit 502 sends the question in the target combination of question and answer to a terminal device, to facilitate the terminal device to display the question in the target combination of question and answer to the user. Specifically, the sending unit 502 may generate information including the question, and then send the information to the terminal device.

In this embodiment, the recognition unit 503 receives to-be-confirmed voice information sent by the terminal device, and recognizes the to-be-confirmed voice information to generate a to-be-confirmed answer corresponding to the to-be-confirmed voice information.

In this embodiment, the determination unit 504 determines that the to-be-confirmed voice information is verified, if the to-be-confirmed answer matches the answer in the target combination of question and answer. Specifically, the answer in the target combination of question and answer may be compared with the to-be-confirmed answer. The matching may be that the similarity between the answer in the target combination of question and answer and the to-be-confirmed answer is high (that is, the similarity is higher than a similarity threshold), or the answer in the target combination of question and answer and the to-be-confirmed answer are identical. The verification of the to-be-confirmed voice information indicates that the to-be-confirmed answer indicated by the voice of the user collected by the terminal device matches the answer in the target combination of question and answer.

In some alternative implementations of the present embodiment, before the acquiring the target combination of question and answer, the method further includes: determining a value of an attribute of a user, based on voiceprint information of the user acquired previously, the attribute including gender and age; and determining the target combination of question and answer matching the value of the attribute of the user from at least one given combination of question and answer.

In some alternative implementations of the present embodiment, after the receiving to-be-confirmed voice information sent by the terminal device, the method further includes: extracting voiceprint characteristic information from the to-be-confirmed voice information, and determining a similarity between the voiceprint characteristic information and pre-stored voiceprint characteristic information of the user.

In some alternative implementations of the present embodiment, the recognizing the to-be-confirmed voice information to generate a to-be-confirmed answer includes: performing speech recognition on the to-be-confirmed voice information to generate an answer string if the similarity is less than or equal to a preset similarity threshold, and defining the answer string as the to-be-confirmed answer.

In some alternative implementations of the present embodiment, after the recognizing the to-be-confirmed voice information to generate a to-be-confirmed answer, the method further includes: comparing the to-be-confirmed answer with the answer in the target combination of question and answer; and determining, if the to-be-confirmed answer is identical to the answer in the target combination of question and answer or the similarity between the to-be-confirmed answer and the answer in the target combination of question and answer is greater than or equal to a preset answer similarity threshold, that the to-be-confirmed answer matches the answer in the target combination of question and answer.

In some alternative implementations of the present embodiment, the question in the combination of question and answer may be a binary question; and the at least one combination of question and answer includes at least one of: the combination of question and answer entered by the user pre-stored on the terminal device, the combination of question and answer in a given knowledge database, or the combination of question and answer about information of an item purchased by the user.

Figure 6:
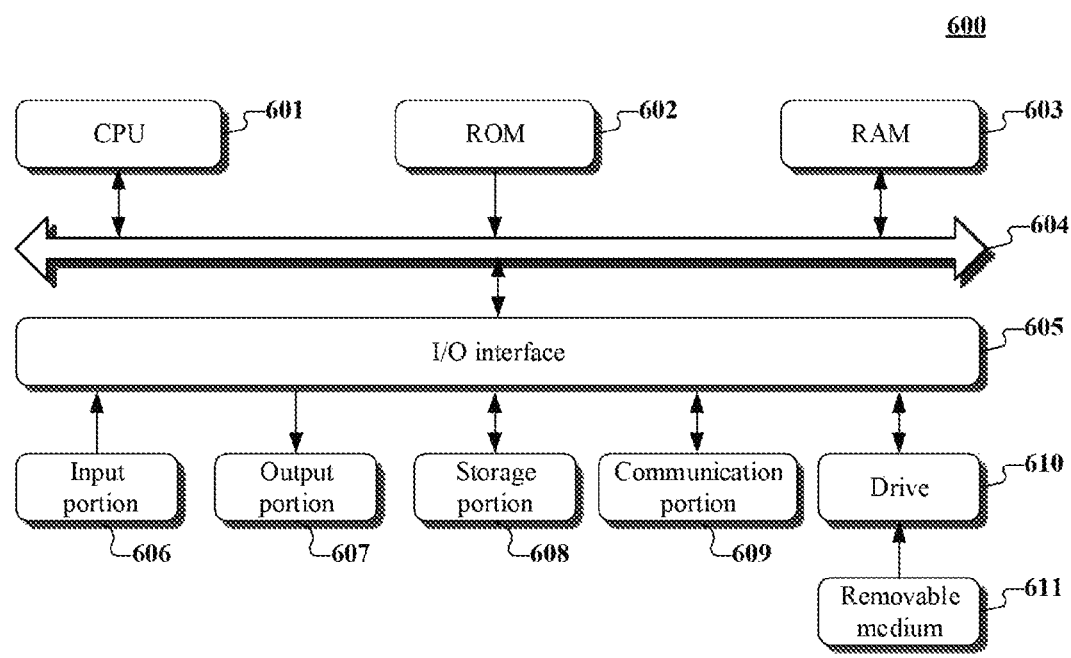
FIG. 6 is a schematic structural diagram of a computer system adapted to implement a server of embodiments of the present disclosure.

Referring to FIG. 6, a schematic structural diagram of a computer system 600 adapted to implement a server of the embodiments of the present application is shown. The server shown in FIG. 6 is merely an example and should not impose any restriction on the function and scope of use of the embodiments of the present application.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A drive 610 is also connected to the I/O interface 605 as required. A removable medium 611, such as a magnetic disk, an optical disk, a magneto-optical disk, and a semiconductor memory, may be installed on the drive 610, to facilitate the retrieval of a computer program from the removable medium 611, and the installation thereof on the storage portion 608 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 609, and/or may be installed from the removable media 611. The computer program, when executed by the central processing unit (CPU) 601, implements the above mentioned functionalities as defined by the methods of the present disclosure. It should be noted that the computer readable medium in the present disclosure may be computer readable storage medium. An example of the computer readable storage medium may include, but not limited to: semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. The computer readable medium may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, which comprises one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present application may be implemented by means of software or hardware. The described units or modules may also be provided in a processor, for example, described as: a processor, comprising an acquisition unit, a sending unit, a recognition unit, and a determination unit, where the names of these units or modules do not in some cases constitute a limitation to such units or modules themselves. For example, the acquisition unit may also be described as "a unit for acquiring a target combination of question and answer."

In another aspect, the present application further provides a non-transitory computer-readable storage medium. The non-transitory computer-readable storage medium may be the non-transitory computer-readable storage medium included in the apparatus in the above described embodiments, or a stand-alone non-transitory computer-readable storage medium not assembled into the apparatus. The non-transitory computer-readable storage medium stores one or more programs. The one or more programs, when executed by a device, cause the device to: acquire a target combination of question and answer, the target combination of question and answer comprising a question and an answer to the question; send the question in the target combination of question and answer to a terminal device; receive to-be-confirmed voice information sent by the terminal device, and recognize the to-be-confirmed voice information to generate a to-be-confirmed answer; and determine that the to-be-confirmed voice information is verified, if the to-be-confirmed answer matches the answer in the target combination of question and answer.

The above description only provides an explanation of the preferred embodiments of the present application and the technical principles used. It should be appreciated by those skilled in the art that the inventive scope of the present application is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present application are examples.

What is claimed is:

1. A method for verifying information, the method comprising:
    establishing and storing a corresponding relationship between values of attributes and QA (question-and-answer) elements each comprising a question and an answer, each of the values of the attributes comprising a value of age and a value of gender, and each of the QA elements corresponding to the value of the attribute;
    determining a value of an attribute of a user, based on voiceprint information of the user acquired previously, the attribute comprising gender and age of the user;
    determining, from the corresponding relationship, the value of the attribute matching the value of the attribute of the user;
    determining the QA element corresponding to the determined value matching the value of attribute of the user as a target combination of question and answer;
    acquiring the target combination of question and answer;
    sending the question in the target combination of question and answer to a terminal device;
    recording a voice of the user and acquiring to-be-confirmed voice information based on the recorded voice;
    receiving the to-be-confirmed voice information sent by the terminal device, and recognizing the to-be-confirmed voice information to generate a to-be-confirmed answer;
    determining that the to-be-confirmed voice information is verified, in response to determining that the to-be-confirmed answer matches the answer in the target combination of question and answer; and
    determining that the user passes a voice verification, in response to determining that the to-be-confirmed answer matches the answer in the target combination of question and answers;
    wherein the method is performed by at least one processor.

2. The method for verifying information according to claim 1, wherein after the receiving to-be-confirmed voice information sent by the terminal device, the method further comprises:
    extracting voiceprint characteristic information from the to-be-confirmed voice information, and determining a similarity between the voiceprint characteristic information and pre-stored voiceprint characteristic information of the user.

3. The method for verifying information according to claim 2, wherein the recognizing the to-be-confirmed voice information to generate a to-be-confirmed answer comprises:
    performing speech recognition on the to-be-confirmed voice information to generate an answer string in response to determining that the similarity is less than or equal to a preset similarity threshold, and defining the answer string as the to-be-confirmed answer.

4. The method for verifying information according to claim 1, wherein after the recognizing the to-be-confirmed voice information to generate a to-be-confirmed answer, the method further comprises:
    comparing the to-be-confirmed answer with the answer in the target combination of question and answer; and
    determining, in response to determining that the to-be-confirmed answer is identical to the answer in the target combination of question and answer or the similarity between the to-be-confirmed answer and the answer in the target combination of question and answer is greater than or equal to a preset answer similarity threshold, that the to-be-confirmed answer matches the answer in the target combination of question and answer.

5. The method for verifying information according to claim 1, wherein the question in the QA element may be a binary question; and
    the QA element comprises at least one of: the combination of question and answer entered by the user pre-stored on the terminal device, the combination of question and answer in a given knowledge database, or the combination of question and answer about information of an item purchased by the user.

6. An apparatus for verifying information, the apparatus comprising:
    at least one processor; and
    a memory storing instructions, the instructions when executed by the at least one processor, cause the at least one processor to perform operations, the operations comprising:
    establishing and storing a corresponding relationship between values of attributes and QA (question-and-answer) elements each comprising a question and an answer, each of the values of the attributes comprising a value of age and a value of gender, and each of the QA elements corresponding to the value of the attribute;
    determining a value of an attribute of a user, based on voiceprint information of the user acquired previously, the attribute comprising gender and age of the user;
    determining, from the corresponding relationship, the value of the attribute matching the value of the attribute of the user;
    determining the QA element corresponding to the determined value matching the value of attribute of the user as a target combination of question and answer;
    acquiring the target combination of question and answer;
    sending the question in the target combination of question and answer to a terminal device;
    recording a voice of the user and acquiring to-be-confirmed voice information based on the recorded voice;
    receiving the to-be-confirmed voice information sent by the terminal device, and recognizing the to-be-confirmed voice information to generate a to-be-confirmed answer;
    determining that the to-be-confirmed voice information is verified, in response to determining that the to-be-confirmed answer matches the answer in the target combination of question and answer; and
    determining that the user passes a voice verification, in response to determining that the to-be-confirmed answer matches the answer in the target combination of question and answers.

7. The apparatus for verifying information according to claim 6, wherein after the receiving to-be-confirmed voice information sent by the terminal device, the operations further comprise:

extracting voiceprint characteristic information from the to-be-confirmed voice information, and determining a similarity between the voiceprint characteristic information and pre-stored voiceprint characteristic information of the user.

8. The apparatus for verifying information according to claim 7, wherein the recognizing the to-be-confirmed voice information to generate a to-be-confirmed answer comprises:

performing speech recognition on the to-be-confirmed voice information to generate an answer string in response to determining that the similarity is less than or equal to a preset similarity threshold, and defining the answer string as the to-be-confirmed answer.

9. The apparatus for verifying information according to claim 6, wherein after the recognizing the to-be-confirmed voice information to generate a to-be-confirmed answer, the operations further comprise:

comparing the to-be-confirmed answer with the answer in the target combination of question and answer; and determining, in response to determining that the to-be-confirmed answer is identical to the answer in the target combination of question and answer or the similarity between the to-be-confirmed answer and the answer in the target combination of question and answer is greater than or equal to a preset answer similarity threshold, that the to-be-confirmed answer matches the answer in the target combination of question and answer.

10. The apparatus for verifying information according to claim 6, wherein the question in QA element may be a binary question; and the QA element comprises at least one of: the combination of question and answer entered by the user pre-stored on the terminal device, the combination of question and answer in a given knowledge database, or the combination of question and answer about information of an item purchased by the user.

11. A non-transitory computer-readable storage medium storing a computer program, the computer program when executed by one or more processors, causes the one or more processors to perform operations, the operations comprising:

establishing and storing a corresponding relationship between values of attributes and QA (question-and-answer) elements each comprising a question and an answer, each of the values of the attributes comprising a value of age and a value of gender, and each of the QA elements corresponding to the value of the attribute;

determining a value of an attribute of a user, based on voiceprint information of the user acquired previously, the attribute comprising gender or age of the user;

determining, from the corresponding relationship, the value of the attribute matching the value of the attribute of the user;

determining the QA element corresponding to the determined value matching the value of attribute of the user as a target combination of question and answer;

acquiring the target combination of question and answer;

sending the question in the target combination of question and answer to a terminal device;

recording a voice of the user and acquiring to-be-confirmed voice information based on the recorded voice;

receiving the to-be-confirmed voice information sent by the terminal device, and recognizing the to-be-confirmed voice information to generate a to-be-confirmed answer;

determining that the to-be-confirmed voice information is verified, in response to determining that the to-be-confirmed answer matches the answer in the target combination of question and answer; and determining that the user passes a voice verification, in response to determining that the to-be-confirmed answer matches the answer in the target combination of question and answers.

12. The method for verifying information according to claim 2, wherein the voiceprint characteristic information comprises at least one of: a degree of retroflexion characteristic parameter, a vocal cord characteristic parameter, an oral cavity characteristic parameter, or a nasal sound characteristic parameter.

* * * * *